F. C. BLANCHARD.
PISTON.
APPLICATION FILED SEPT. 24, 1909.

949,993.

Patented Feb. 22, 1910.

WITNESSES:
Josephine H. Ryan
Charles S. Willery

INVENTOR:
Frederick C. Blanchard
by Roberts Roberts & Cushman
Attorneys

UNITED STATES PATENT OFFICE.

FREDERICK C. BLANCHARD, OF BRIDGEPORT, CONNECTICUT, ASSIGNOR TO THE ASHCROFT MANUFACTURING COMPANY, OF BRIDGEPORT, CONNECTICUT, A CORPORATION OF CONNECTICUT.

PISTON.

949,993. Specification of Letters Patent. Patented Feb. 22, 1910.

Application filed September 24, 1909. Serial No. 519,417.

*To all whom it may concern:*

Be it known that I, FREDERICK C. BLANCHARD, a citizen of the United States, and resident of Bridgeport, in the county of Fairfield and State of Connecticut, have invented new and useful Improvements in Pistons, of which the following is a specification.

This invention relates to pistons and more particularly to pistons for use in steam engine indicators.

The pistons heretofore commonly employed in steam engine indicators have proved unsatisfactory in use for the reason that the large amount of foreign matter—dirt and scale—blown out with the steam, collects in the cylinder causing the piston to cut and stick, thus seriously interfering with its operation, and even in many cases rendering the indicator inoperative and useless. This result is especially likely to arise where, as in the case of trial trips of warships, new boilers and engines are put to a severe test.

It is the object of this invention to provide a piston of light and simple construction which will work freely and easily in the cylinder and will not be injuriously affected by the dirt and scale blown out with the steam.

The invention is characterized by a piston which works freely within the cylinder and is adapted to collect the foreign matter, and thereafter retain it out of contact with the cylinder walls so that the free working of the piston is not injuriously affected thereby.

Figure 1:
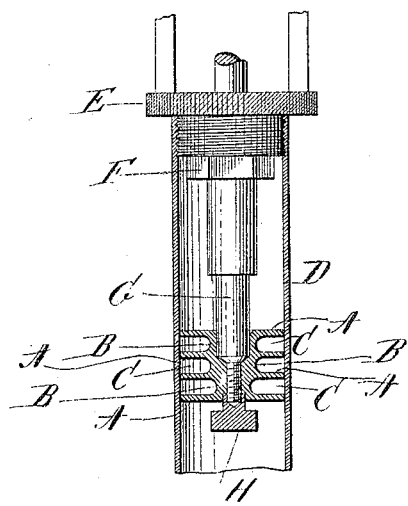
Figure 2:
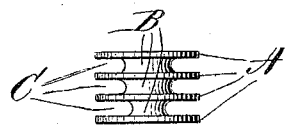

Referring to the drawings which illustrate an embodiment of my invention,—Figure 1 is a sectional view of the improved piston; and Fig. 2 is an elevation of the same.

E is a cap screwed into the top end of the cylinder D and provided with a sleeve or guide F forming a long bearing for the piston rod G. The improved piston is composed of a plurality of thin, parallel, annular disks A, connected by a stem B and spaced apart to form the chambers or pockets C, the inner wall of said chambers being provided by the stem. As illustrated in the drawings, the piston is provided with four disks; but the number of disks and their proximity to one another is immaterial provided the chambers or pockets C formed thereby are of sufficient capacity to receive and retain foreign matter as presently to be described. A check nut H upon the end of the piston rod, prevents the piston from unscrewing therefrom.

In use, as the piston works back and forth in the cylinder, the thin contact surfaces of the disks A scrape the walls of the cylinder clean of the foreign matter blown out with the steam, and which tends to accumulate thereon, and gather it into the chambers or pockets C where it is retained out of contact with the walls of the cylinder and may accumulate in considerable quantity without injuriously affecting the working of the piston. If a very large amount of foreign matter is accumulated in the chambers as when the indicator is used on a long run with new boilers and engines, the piston may be taken from the cylinder and readily and quickly cleaned and replaced.

In order that the piston may work freely and easily in the cylinder, it is preferably made of steel which, by reason of the fact that its co-efficient of expansion is less than that of the bronze or composition metal of which the cylinder is commonly made, expands slightly less than the cylinder walls when subjected to the rise in temperature which takes place when the indicator is put in service, resulting in an increase of clearance between the piston and the cylinder walls. The free working of the piston is further insured by the adaptability of the chambers or pockets C to accumulate and retain a comparatively large volume of a mixture of oil and water which thoroughly lubricates the piston in its action within the cylinder.

By this construction a piston is obtained which is simple, light and readily and economically manufactured, which works freely and easily in the cylinder and which without multiplication of the parts heretofore in common use, insures the elimination of the difficulties and annoyances heretofore caused by accumulation of foreign matter in the cylinder.

What I claim and desire to secure by Letters Patent is:

1. The combination with a steam cylinder, of a piston mounted to reciprocate therein, said piston having a removable head comprising relatively thin parallel disks spaced apart to form annular chambers, the inner wall of each chamber being located adjacent to the member on which the head is supported, whereby chambers of a capacity sufficient to receive and accumulate foreign matter out of contact with the cylinder walls will be provided.

2. The combination with a steam cylinder, of a piston mounted to reciprocate therein, said piston having a removable head comprising a stem and relatively thin parallel disks supported thereby, said disks being spaced apart a distance not less than the thickness of the disks to form chambers, said stem providing the inner wall for each chamber, whereby chambers of capacity sufficient to receive and accumulate foreign matter out of contact with the cylinder walls will be provided.

3. The combination with a steam cylinder, of a piston mounted to reciprocate therein, said piston having a removable head comprising relatively thin parallel disks spaced apart to form annular chambers, the inner wall of each chamber being located adjacent to the member on which the head is supported, whereby chambers of a capacity sufficient to receive and accumulate foreign matter out of contact with the cylinder walls will be provided, said piston being formed of a metal having a lower co-efficient of expansion than that of the cylinder.

4. The combination with a bronze steam cylinder, a piston mounted to reciprocate therein, said piston having a removable steel head comprising relatively thin parallel disks spaced apart to form annular chambers, the inner wall of each chamber being located adjacent to the member on which the head is supported, whereby chambers of a capacity sufficient to receive and accumulate foreign matter out of contact with the cylinder walls will be provided.

Signed by me at Bridgeport, Connecticut, this twenty-second day of September, 1909.

FREDERICK C. BLANCHARD.

Witnesses:
W. R. CLARKE,
WM. R. STROUD.